United States Patent [19]

Watts

[11] 4,230,761

[45] Oct. 28, 1980

[54] COMPOSITE OF A HIGH NITRILE COPOLYMER ADHERED TO AN OLEFIN BASED POLYMER

[75] Inventor: William A. Watts, Uniontown, Ohio

[73] Assignee: The Goodyear Tire & Rubber Company, Akron, Ohio

[21] Appl. No.: 872,405

[22] Filed: Jan. 26, 1978

[51] Int. Cl.² ..................... B32B 27/08; B32B 27/32; B32B 27/30
[52] U.S. Cl. ............................ 428/215; 428/216; 428/517; 428/518; 428/519; 428/520; 428/521; 428/522
[58] Field of Search .............. 428/215, 517, 520, 518, 428/519, 216, 521, 522

[56] References Cited

U.S. PATENT DOCUMENTS

| | | |
|---|---|---|
| 2,775,537 | 12/1956 | Wilson .............................. 428/517 X |
| 3,222,211 | 12/1965 | Updegrove et al. ............ 428/517 X |
| 3,919,035 | 11/1975 | Warrach ............................. 428/520 |
| 3,970,771 | 7/1976 | Davison ............................. 428/520 |

FOREIGN PATENT DOCUMENTS 2633081 2/1977 Fed. Rep. of Germany .......... 428/520
936666 9/1963 United Kingdom .

Primary Examiner—Ellis P. Robinson
Attorney, Agent, or Firm—J. D. Wolfe

[57] ABSTRACT

A composite or laminate comprised of a high nitrile copolymer, preferably 55 to 95 percent of acrylonitrile, with alkyl acrylate or methacrylate and styrene or butadiene adhered to an olefin based polymer with a two-phase block polymer adhesive, said adhesive comprising an elastomeric based block having at least two terminal nonelastomeric blocks.

9 Claims, No Drawings

COMPOSITE OF A HIGH NITRILE COPOLYMER ADHERED TO AN OLEFIN BASED POLYMER

This invention relates to a composite of (1) a copolymer of a high nitrile based copolymer adhered to (2) an olefinic based polymer with an adhesive comprising a two-phase block polymer having an elastomeric block and at least two nonelastomeric terminal blocks. More particularly, this invention relates to a laminate of a high acrylonitrile/butadiene/alkyl acrylate or methacrylate polymer adhered to an ionic copolymer of ethylene/methacrylic acid with an adhesive comprising a two-phase block polymer having a rubbery poly(ethylene-butylene) matrix with terminal polystyrene domains.

It is known that films of the copolymer of a high nitrile containing polymer does not have satisfactory properties to be used as a barrier packaging film due to its poor water vapor transmission and heat seal properties. Likewise, it is known that films of olefinic based polymers do not have properties satisfactory for a barrier packaging film due to its poor oxygen transmission properties. Even though a film can be co-extruded or laminated from the copolymer of high nitrile polymers and olefinic based polymers, the adhesion between film laminae is less than 0.1 pounds per inch of width at the interface and consequently delaminates readily. Hence, the co-extruded or laminated structure is unsatisfactory for packaging perishable goods.

A principal object of this invention is to provide an adhesive of the type described hereinafter capable of being co-extruded or laminated with the above polymer composite to give a composite having an interfacial separation strength between its layers of at least one pound per inch of width, thereby providing a composite film which has utility in the packaging of perishable goods such as certain goods and pharmaceuticals which are necessarily isolated from air, or gaseous contamination of the atmosphere, until the goods are consumed. Further utility is realized in packaging goods which discharge toxic, corrosive or malodorous vapors. A minimum of contact with air is desirable, for example, in packaging of potato chips, coffee, tea, frozen foods and certain meat products which are sold in a refrigerated but unfrozen condition.

The adhesive portion of the composite comprises a two-phase block polymer comprised of an elastomeric block and at least two nonelastomeric terminal blocks. The nonelastomeric blocks are obtained by polymerization of monomers of monovinyl aromatic hydrocarbons selected from the class consisting of at least one of styrene, alpha-methylstyrene and vinyl toluene to give blocks having an average molecular weight in the range of about 7000 to about 65,000 and a glass transition temperature above about 25° C. Generally, the total nonelastomeric terminal block content of said block polymer is about 4 to about 81 weight percent of the block polymer. The elastomeric block is obtained by polymerization of conjugated dienes, preferably with organo lithium catalyst selected from at least one of the conjugated dienes having 4 to 10 carbon atoms and preferably 4 to 5 carbon atoms per monomer molecule. Specific examples of these dienes are butadiene and isoprene. Normally the dienes are polymerized to blocks having an average molecular weight of about 30,000 to about 300,000 and a glass transition temperature below about 10° C. The resulting composite structure has satisfactory properties for use as a packaging article because of its unique combination of properties such as low oxygen/water vapor transmission rates, broad heat sealing temperature range, excellent heat shrink and above all exceptional ply adhesion properties.

Representative examples of a copolymer of high nitrile polymers are acrylonitrile, methacrylonitrile and ethacrylonitrile with the comonomers selected from at least one of styrene, vinylidene chloride, butadiene and alkyl acrylates and alkyl methacrylates wherein the alkyl group contains from 2 to 10 carbon atoms. Furthermore, the nitrile portion of the copolymer is about 55 to about 95 weight percent of the copolymer.

Representative examples of olefinic based polymers are those formed from the following monomers or monomer pairs: ethylene, propylene, butene, ionic ethylenemethacrylic acid, ionic ethylene methacrylic acid-vinyl acetate, ethylene copolymers where the comonomer is selected from at least one of ethyl acrylate, vinyl acetate, acrylic acid, vinyl chloride, vinyl alcohol, propylene, butene and the like.

The nature of this invention may be more readily appreciated by reference to the illustrative and representative examples wherein all parts and percentages are by weight unless otherwise indicated.

EXAMPLE I

Using the well-known concepts of polymer polarity and solubility parameter as the basis for selection, several polymeric film systems were evaluated as an adhesive layer for the two-ply film construction. The adhesive films were evaluated by placing them between two thin films of Barex ™ and Surlyn ™ and heat sealing the composite or film structure at 400° F. for one second at 20 psi pressure using the Sentinel heat-sealer, Model 12AS. Then each of the film composites were cooled and examined for its ability to adhere to the Barex 210 ™ and Surlyn ™ and results of this examination are shown in Table 1.

TABLE 1

| | Adhesion to | |
|---|---|---|
| Polymeric Adhesive System | Barex 210 | Surlyn[1] |
| (1) 60/40, 2-EHA/AN | yes | no |
| (2) 67/33, Bd/AN | yes | no |
| (3) 82/18, E/EA | no | yes |
| (4) 80/20, E/AA | no | yes |
| (5) 50/50 blend of (1) and (3) | no | yes |
| (6) 50/50 blend of (1) and (4) | no | yes |
| (7) 50/50 blend of (2) and (4) | no | yes |
| (8) SBS - 30% styrene | yes | no |
| (9) S(EB)S - 30% styrene | yes | yes |

Of nine most likely candidates from well-known concepts of polymer polarity and solubility parameter only one, namely No. 9 is shown as adhering to both films. This successful candidate No. 9, namely, the Barex 210/S(EB)S/Surlyn composites were further evaluated by measuring the seal strength (#/In.) of the seal. Using the Suter Tensile Tester, it was determined that the 3-ply film construction required 2.58 #/In. to separate the layers (tearing at interface) as compared to 0.0 #/In. for the Barex 210/Surlyn film construction.

The Code names used in Table 1 above designate the following substances or polymers:

Barex 210 ™ —a high acrylonitrile-butadiene/methyl acrylate polymer.

Surlyn TM film—a 50/50 blend of Surlyn 1606 and Surlyn 1652, ionic polymers of ethylene and methacrylic acid.

2-EHA/AN—a 2-ethylhexyl acrylate/acrylonitrile copolymer.

Bd/AN—a butadiene/acrylonitrile copolymer.

E/EA—an ethylene/ethyl acrylate copolymer.

E/AA—an ethylene/acrylic acid copolymer.

SBS—Kraton 1101 TM, styrene-butadiene-styrene block polymer.

S(EB)S—Kraton G TM, Shell Chemical Co's tradename for a hydrogenated styrene-butadiene-styrene block polymer.

Peel adhesion strength was measured by a Suter Tensile Tester with a crosshead speed of 60"/min. and a sample size 1" width. The first three samples were initially separated by wetting with tetrahydrofuran (THF) which dissolved the adhesive layer to facilitate separation of the layers.

EXAMPLE II

An ABC structure was prepared consisting of (A) (a high acrylonitrile-butadiene/methyl acrylate), (B) (a two-phase polymer comprising polystyrene domains in a rubbery poly(ethylenebutylene) matrix), and (C) (an ionic ethylene-methacrylic acid) using a standard three-extruder head set-up and passing the extrudates from each extruder through a three-way die assembly to prepare multilayered films. The structure was tested for peel adhesion using the Suter Tensile Tester. The results were 2.8#/In. of width compared to 0.0 #/In. for the control AC structure. The three-component film structure was able to protect perishable products which require the absence of air and moisture and had over one pound per square inch peel resistance.

Similar composite films can be made by charging the respective extruder with the (A), (B) and (C) polymers. Polymer (C) can be an ionic polyethylenepoly(methacrylic acid) containing no more than about 20% by weight of methacrylic acid units and a polymer of ethylene, methacrylic acid and vinyl acetate monomers where the methacrylic acid is no more than about 15 weight percent of the polymer and the balance is divided 95-60 percent ethylene and 5 to 40 percent vinyl acetate.

Preferred results are obtained where each layer of the composite is 0.5 to 20 mils thick. For example, in making composite films as above, polymer (A) can be an interpolymer composed of 50-61% acrylonitrile, 15-12% butadiene, 5-3% methyl acrylate and 30-24% styrene. Another useful interpolymer for polymer A is 60-80% acrylonitrile, 10-2% butadiene and 30 to 18% styrene. Also, a copolymer 66-72% acrylonitrile and 34-28% styrene can be used as a polymer (A) with any of the polymers (B) and (C) listed herein.

Polymer (B) can be a hydrogenated block polymer of styrene-isoprene-styrene containing 60 to 80% styrene monomer.

While certain representative embodiments and details have been shown for the purpose of illustrating the invention, it will be apparent to those skilled in this art that various changes and modifications may be made therein without departing from the spirit or scope of the invention.

What is claimed is:

1. A composite comprising a high nitrile copolymer of 55 to 95 mol percent of a nitrile monomer selected from the class consisting of acrylonitrile, methacrylonitrile and ethacrylonitrile, and the balance composed of butadiene or styrene and a monomer of alkyl acrylate or methacrylate where the alkyl radical contains from 2 to 10 carbon atoms adhered to an olefinic base polymer of simple olefins of 2 to 6 carbon atoms and an olefinic carboxylic acid of 3 to 8 carbon atoms with a two-phase block polymer adhesive comprising an elastomeric base block having at least two terminal nonelastomeric blocks, said elastomeric base block being the polymer of a conjugated diene of 4 to 8 carbon atoms and the nonelastomeric block being the polymer of a monomer selected from the class consisting of styrene, alpha-methylstyrene and vinyl toluene.

2. The composite of claim 1 where the two-phase block polymer adhesive is composed of an elastomeric base block having an average molecular weight of 30,000 to 300,000 and a glass transition temperature below 10° C. and the nonelastomeric terminal block of 7000 to 65000 average molecular weight and a glass transition temperature above 25° C.

3. The composite of claim 2 wherein the nonelastomeric terminal block is polystyrene.

4. The composite of claim 3 wherein the elastomeric base block is polybutadiene.

5. The composite of claim 3 wherein the elastomeric base block is polyisoprene.

6. The composite of claim 1 wherein the nitrile copolymer is composed of acrylonitrile and styrene.

7. The composite of claim 1 wherein the thickness of each part of the composite is from 0.5 to 20 mils and the high nitrile copolymer is an acrylonitrile-butadiene alkyl acrylate, the olefinic base polymer is a copolymer of ethylene or butylene with methacrylic acid and the adhesive is a block polymer of butadiene and styrene.

8. The composite of claim 1 is a film.

9. The composite of claim 1 wherein each layer of the composite is composed of an inner layer of a composition selected from the class consisting of a hydrogenated styrene-butadiene-styrene-isoprene-styrene block polymer having adhered thereto on one face an interpolymer selected from the class consisting of polymer of acrylonitrile-butadiene-methyl acrylate, polymer of acrylonitrile-butadiene-methyl acrylate-styrene, polymer of acrylonitrile-butadiene-styrene and copolymers of acrylonitrile-styrene and adhered to the other face a composition selected from the ionic polymers consisting of the polymer of ethylene-methacrylic acid, to polymers of ethylene-methacrylic acid-vinyl acetate, polymers of ethylene and polymers of ethylene/vinyl acetate.

* * * * *